United States Patent
Reisinger et al.

(10) Patent No.: US 11,728,529 B2
(45) Date of Patent: Aug. 15, 2023

(54) TEMPERATURE CONTROL SYSTEM

(71) Applicant: Mahle International GmbH, Stuttgart (DE)

(72) Inventors: Dieter Reisinger, Vaihingen/Enz (DE); Daniel Stehlik, Freiberg a. Neckar (DE)

(73) Assignee: Mahle International GmbH

(*) Notice: Subject to any disclaimer, the term of this patent is extended or adjusted under 35 U.S.C. 154(b) by 496 days.

(21) Appl. No.: 16/884,020

(22) Filed: May 26, 2020

(65) Prior Publication Data

US 2020/0381787 A1 Dec. 3, 2020

(30) Foreign Application Priority Data

May 27, 2019 (DE) .......................... 102019207726.9

(51) Int. Cl.
*H01M 10/613* (2014.01)
*H01M 10/653* (2014.01)

(52) U.S. Cl.
CPC ....... *H01M 10/613* (2015.04); *H01M 10/653* (2015.04)

(58) Field of Classification Search
CPC .. H01M 10/613; H01M 10/653; H01M 50/20; H01M 10/625; H01M 2220/20; H01M 10/6556; Y02T 10/70; Y02E 60/10; G05D 23/1931
See application file for complete search history.

(56) References Cited

U.S. PATENT DOCUMENTS

| | | | | |
|---|---|---|---|---|
| 2011/0138849 A1* | 6/2011 | Hirano | ............... | F28D 15/0266 62/513 |
| 2015/0079442 A1* | 3/2015 | Haussmann | ........ | H01M 10/625 429/120 |
| 2018/0048039 A1* | 2/2018 | Newman | ............. | H01M 10/625 |
| 2019/0131602 A1* | 5/2019 | Hilfrich | .............. | H01M 50/278 |
| 2021/0387546 A1* | 12/2021 | Grubwinkier | ........... | B60L 58/12 |

FOREIGN PATENT DOCUMENTS

| | | |
|---|---|---|
| CN | 201402416 Y | 2/2010 |
| CN | 103620170 A | 3/2014 |
| CN | 108312840 A | 7/2018 |
| DE | 102017120737 A1 | 3/2019 |
| WO | 2017002325 | 1/2017 |

OTHER PUBLICATIONS

Chinese Search Report dated Mar. 29, 2021 related to corresponding Chinese Patent Application No. 202010447674.1.
Chinese Office Action dated Apr. 6, 2021 related to corresponding Chinese Patent Application No. 202010447674.1.
English abstract for DE-102017120737.

* cited by examiner

*Primary Examiner* — Muhammad S Siddiquee
(74) *Attorney, Agent, or Firm* — Fishman Stewart PLLC

(57) ABSTRACT

The present disclosure describes a temperature control system for an energy store of a motor vehicle, e.g., an electric and/or hybrid vehicle. The temperature control system includes at least one temperature control plate including at least one contact plate and at least one base plate. The at least one contact plate has at least one surface portion for contacting the at least one energy storage cell. The at least one temperature control plate defining at least one sealing portion for sealing a at least one flow space relative to an interior space of the energy store. The at least one sealing portion comprises at least one intermediate sealing portion and at least one collection passage. The at least one sealing portion includes at least one safety seal, structured and arranged to seal the at least one collection passage relative to the interior space.

20 Claims, 3 Drawing Sheets

TEMPERATURE CONTROL SYSTEM

CROSS-REFERENCE TO RELATED APPLICATION

This application claims priority to German Application No. DE 10 2019 207 726.9 filed on May 27, 2019, the contents of which are hereby incorporated by reference in its entirety.

TECHNICAL FIELD

The present invention relates to a temperature control system for temperature controlling an energy store and to an energy store having such a temperature control system. Furthermore, the invention relates to a motor vehicle, in particular an electric and/or a hybrid vehicle having such an energy store.

BACKGROUND

Energy stores, in particular traction battery systems, for electric or hybrid vehicles require operation within a predefined temperature range in order to make available a desired electric power and so as not to undershoot a demanded minimum lifespan of the energy store. Such energy stores can comprise an energy storage cell or multiple energy storage cells, in which a pre-set electric amount of energy is stored and/or can be stored. Depending on the field of application of the energy store and its surrounding temperature, it can be required for example that the energy store and/or the energy storage cell is cooled or heated. In order to make possible an operation of the energy store within the predefined temperature range, the energy stores and/or the energy storage cells are temperature controlled by means of a temperature control system, i.e. for example cooled and/or heated. Such a temperature control system can comprise a plate-shaped temperature control plate through which fluid flows.

In particular, a temperature control fluid, which flows through the temperature control plate, cannot come into contact with the energy storage cells since this can lead to a destruction of the energy store and/or damage to vehicle and/or injury to persons.

SUMMARY

The present invention is based on the object of stating an improved or at least alternative embodiment of a temperature control system of the type mentioned at the outset, which in particular has an increased protection against the energy storage cells contacting the temperature control fluid.

According to the invention, this problem is solved through the subjects of the independent claim(s). Advantageous embodiments are subject of the dependent claims.

The present invention is based on the general idea that the temperature control system for sealing a flow space relative to an interior space of the energy store comprises at least one sealing portion having at least one intermediate sealing portion and at least one collection passage.

The temperature control system for temperature controlling an energy store according to the invention comprises at least one temperature control plate which comprises at least one contact plate and at least one base plate. The contact plate and the base plate can be connected to one another at least in portions, wherein in particular a positive-locking and/or firmly bonded connection can be provided. Temperature control can mean a cooling and/or heating. It can be provided that the contact plate is formed from a metallic material, in particular aluminium, and/or that the base plate is formed from a metallic material and/or plastic. A plate is to mean a flat body whose material thickness is less than a length of a longitudinal side of the body and/or whose material thickness is less than a length of a narrow side of the body. Such a body can be substantially cuboid in shape.

The contact plate comprises at least one first surface portion for contacting, in particular for thermally contacting an energy storage cell of the energy store. The first surface portion can be substantially formed flat and/or planar. By way of this, for example a substantially homogeneous thermal contacting and/or thermal connection between the energy storage cell and the first surface portion can be made possible. The contacting, in particular the thermal contacting, between the first surface portion and an energy storage cell of the energy store can be designed or effected directly and/or indirectly. In the case of a direct contacting, the energy storage cell, with an area portion, lies at least partly on the first surface portion. In the case of an indirect contacting a heat conducting means, in particular a heat conducting paced, and/or a heat conducting element, in particular a heat conducting film, is arranged between the energy storage cell and the first surface portion.

Between the contact plate and the base plate, at least one flow space for a temperature control fluid is formed. A temperature control fluid, which flows through this flow space, makes possible by way of a heat absorption and/or heat emission an operation of the energy store, in particular of the energy storage cell, within a predefined temperature range, so that the energy storage cell, as a function of the ambient temperature, can for example be cooled and/or heated. The temperature control fluid can be for example a coolant or a refrigerant. The temperature control fluid can be present in a liquid state of aggregation when it flows through the flow space.

The temperature control plate forms at least one sealing portion for sealing the flow space relative to an interior space of the energy store, in order to prevent a contacting of the temperature fluid, which can flow through the flow space, with an energy storage cell of the energy store. Described in other words, entering of the temperature control fluid in the interior space of the energy store is prevented.

The at least one sealing portion comprises at least one intermediate sealing portion and at least one collection passage, wherein the at least one intermediate sealing portion is formed between the flow space and the collection passage for sealing the flow space relative to the collection passage.

The intermediate sealing portion can comprise at least one intermediate seal. This intermediate seal can be designed as a static sealing element, in particular as sealing compound and/or as shaped sealing element and/or as film sealing element and/or as ring sealing element.

In the event that in the intermediate sealing portion, for example through mechanical effects and/or material aging, a leakage should form, the temperature control fluid flowing through the intermediate sealing portion can be collected in the collection passage.

The sealing portion comprises at least one safety seal which is designed for sealing the collection passage relative to the interior space of the energy store. By way of this it is prevented that the temperature control fluid enters the interior space of the energy store so that a contacting between the temperature control fluid and an energy storage cell of the energy store is prevented. The safety seal and an intermediate seal of the intermediate sealing portion can be arranged spaced apart from one another. The safety seal and the intermediate sealing portion can be arranged spaced apart from one another and offer an increased protection against the temperature fluid entering the interior space of the energy store.

In an advantageous further development of the solution according to the invention it is provided that the sealing portion is arranged along the contact plate circumferentially in the circumferential direction. Advantageous in this is that the flow space can be completely sealed in the circumferential direction of the contact plate relative to the interior space of the energy store. The intermediate sealing portion can be arranged circumferentially in the circumferential direction along the contact plate. The safety seal can be arranged circumferentially in the circumferential direction along the contact plate.

In a further advantageous embodiment of the solution according to the invention it is provided that the at least one collection passage is arranged outside along the contact plate circumferentially in the circumferential direction. By way of this, any leaking temperature control fluid upon a leakage of the intermediate sealing portion can be collected in the circumferential direction of the contact plate.

In an advantageous further development of the solution according to the invention it is provided that the at least one collection passage comprises at least one return device for returning the temperature control fluid. By way of this return device, which can be designed for example as a return passage, the temperature control fluid, which is present and/or flows into the collection passage, can be fed to a temperature control fluid circuit. It can be provided that the return device comprises a non-return valve, which makes possible temperature control fluid flowing out of the collection passage along the return device but prevents the same flowing into the collection passage along the return device. Advantageous in this is that for example the temperature control fluid quantity in the temperature control fluid circuit is not substantially reduced, so that even in the case of a leakage of the intermediate sealing portion a continued operation of the energy store is at least temporarily made possible. Apart from this, temperature fluid leaking out into the surroundings of the energy store is prevented. Additionally, the collection passage in terms of volume can be designed smaller through a discharging of the temperature control fluid so that the mechanical resistance of the temperature control plate, in particular of the base plate, is not substantially affected negatively.

In a further advantageous embodiment of the solution according to the invention it is provided that the collection passage and/or the return device is fluidically connected to a temperature control fluid circuit, and/or that the flow space is fluidically connected to the temperature control fluid circuit. The flow space, for this purpose, can comprise a temperature control fluid inlet and a temperature control fluid outlet, which are fluidically connected to the temperature control fluid circuit. The temperature control fluid circuit can comprise a delivery device, in particular an electrically driven delivery device, for delivering the temperature control fluid. The collection passage and/or the return device and the flow space can be fluidically connected to a common temperature control fluid circuit, wherein temperature fluid out of the temperature fluid circuit flowing into the collection passage can be prevented by the return device.

In an advantageous further development of the solution according to the invention it is provided that the at least one intermediate sealing portion is at least partly formed by a collar portion of the contact plate, an intermediate groove of the base plate and at least one intermediate seal. The collar portion of the contact plate can be orientated and/or formed substantially transversely and/or perpendicularly to the first surface portion of the contact plate. The collar portion is arranged outside along the contact plate circumferentially in the circumferential direction, wherein the intermediate groove of the base plate is formed circumferentially in the circumferential direction of the contact plate. The collar portion is at least partly arranged in the intermediate groove, wherein the at least one intermediate seal seals the collar portion in the intermediate groove relative to the base plate. This results in a mechanically stable positioning or substantially static arrangement of the intermediate seal. The intermediate seal can connect the contact plate to the base plate at least in portions, in particular the intermediate seal can connect the contact plate to the base plate in a firmly bonded manner.

In a further advantageous embodiment of the solution according to the invention it is provided that the collection passage is at least partly formed by at least one passage groove of the base plate. Transversely to the circumferential direction, the passage groove can have a substantially rectangular cross section. Transversely to the circumferential direction, the passage groove can have a substantially step-like cross section. The passage groove can form at least one fluid-limiting wall portion of the collection passage. This makes possible a simple manufacture of the temperature control plate and in particular of the base plate, which can be designed for example as injection moulded plastic part.

In an advantageous further development of the solution according to the invention it is provided that the collection passage is at least partly formed by the collar portion of the contact plate and/or by the at least one intermediate seal, and/or that the collection passage is at least partly formed by the safety seal. Here it can be provided that the collar portion of the contact plate and/or that the at least one intermediate seal and/or that the safety seal in each case form at least one fluid-limiting wall portion of the collection passage. This makes possible a simple and cost-effective manufacture of the collection passage.

In a further advantageous embodiment of the solution according to the invention it is provided that the intermediate seal is formed as a static sealing element, in particular as sealing compound and/or as shaped sealing element and/or as film sealing element and/or as ring sealing element, and/or that the safety seal is formed as a static sealing element, in particular as sealing compound and/or as shaped sealing element and/or as film sealing element and/or as ring sealing element.

The intermediate seal in the form of a sealing compound can be introduced for example as adhesive and/or as adhesive sealing compound between the contact plate and the base plate, in particular between the collar portion of the contact plate and the intermediate groove of the base plate. The safety seal can be formed as film sealing element. Such a film-like safety seal can be connected with a first portion to the base plate in a firmly bonded manner, wherein a second portion of the film-like safety seal spaced apart from the first portion can be connected to the contact plate in a firmly bonded manner, in particular with a part region of the first surface portion of the contact plate.

It can be provided that an intermediate seal and the safety seal are substantially formed similarly. Here it can be provided for example that the intermediate seal and the safety seal are each formed as ring sealing element in the form of an O-ring.

In a further advantageous embodiment of the solution according to the invention it is provided that the base plate comprises at least one structured surface portion with multiple structure elevations, wherein the structure elevations lie against a second surface portion of the contact plate facing the base plate. The structure elevations prevent bending-through of the contact plate and/or of the base plate which would for example result in a reduction in size of the flow space and thus in an increase of the flow resistance, which in turn could result in an inadequate temperature control of the energy store. The structure elevations can be arranged spaced apart from one another. It can be provided that the structure elevations are connected to the contact plate, in particular to the second surface portion of the contact plate in a firmly bonded manner, for example by way of soldering, gluing or welding.

In a further advantageous embodiment of the solution according to the invention it is provided that at least one sensor unit is arranged in the collection passage. The sensor unit can be arranged for example downstream or upstream of a return device. The sensor device can comprise in particular a moisture sensor and/or a liquid sensor. The sensor unit can be communicatingly connected to a control device of a motor vehicle. Upon a leakage of the intermediate sealing portion, the sensor unit transmits for example a warning signal to the control device of the motor vehicle. The control device can for example save this warning signal and/or pass this warning signal onto a display device of a vehicle driver and/or a maintenance device of a maintenance employee. By way of this, a leakage of the intermediate sealing portion can be timely determined so that further damage to the energy store can be prevented by way of repair and/or replacement.

Furthermore, the invention relates to an energy store, in particular a traction battery, for an electric and/or hybrid vehicle, having at least one energy storage cell and at least one temperature control system according to the invention, wherein the at least one energy storage cell is arranged in an interior space of the energy store and heat-transferringly connected to the contact plate of the respective temperature control system. The at least one energy storage cell can indirectly and/or directly contact the contact plate, in particular the first surface portion of the contact plate, of the respective temperature control system.

It can be provided that the energy store comprises multiple energy storage cells, which are temperature controlled for example either with a separate temperature control system each or are temperature controlled via a common temperature control system. It can also be provided that a first group of energy storage cells is temperature controlled via a first common temperature control system, whereas a second group of energy storage cells are temperature controlled via a second common temperature control system.

In a further advantageous embodiment of the solution according to the invention it is provided that the interior space is enclosed by a housing of the energy store, and that the temperature control system forms a housing portion of the housing and/or that the temperature control system is arranged in a housing portion of the housing. The housing can be formed in one part, wherein the temperature control system can then be integrally formed by the housing. The housing can be formed in multiple parts, so that a modular construction materializes, wherein for example a side wall of the housing can be formed by at least one temperature control system. This makes possible a spatially compact and weight-reduced construction of the energy store.

Furthermore, the invention relates to a motor vehicle, in particular an electric and/or hybrid vehicle, having an energy store according to the invention for the electric energy supply of a drive unit of the motor vehicle. The motor vehicle can comprise a drive unit that has to be supplied with electric energy in order to make possible a locomotion of the motor vehicle. Depending on weather conditions, it can be necessary for an optimum power output and an adequate lifespan of the energy store that the energy store is temperature controlled, i.e. cooled and/or heated. A motor vehicle can be an electrically driven road vehicle.

In an advantageous further development of the solution according to the invention it is provided that the temperature control system of the energy store is fluidically connected to at least one heat exchanger of the motor vehicle. The heat exchanger can be designed as heat source or as heat sink. The temperature control system, in particular the collection passage and the flow space, and the heat exchanger can be fluidically connected to a temperature control fluid circuit. The motor vehicle can comprise a control device, which can be communicatingly connected to at least one sensor unit of the temperature control system.

Further important features and advantages of the invention are obtained from the sub claims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
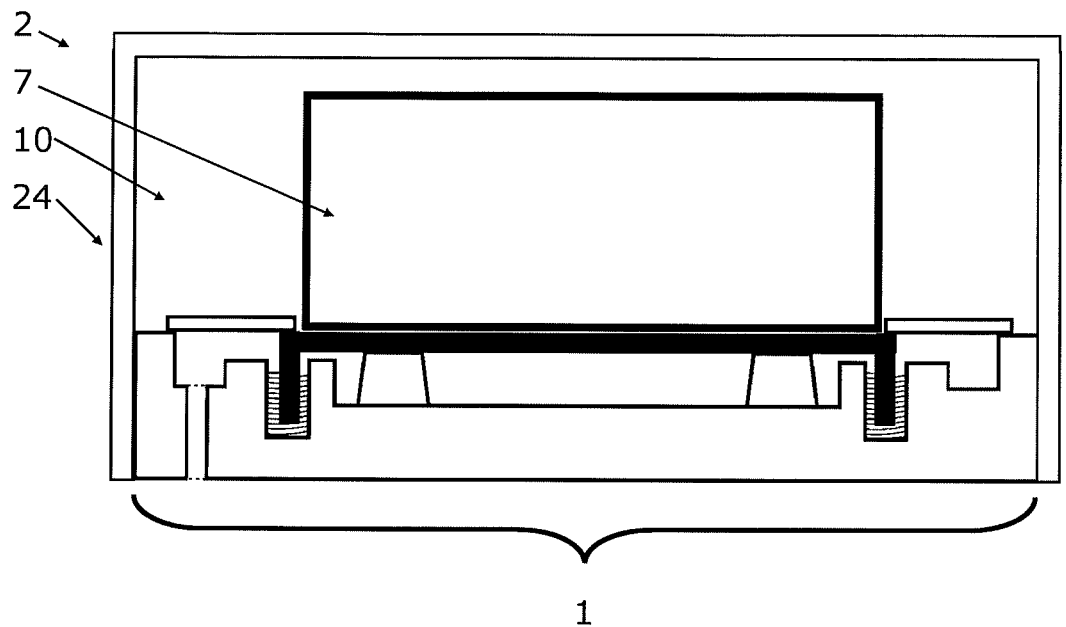
FIG. 1 a sectional view of an energy store according to the invention.

In FIG. 1, a sectional representation through an energy store 2 according to the invention is shown. The energy store 2 comprises a housing 24, wherein a side wall or a bottom section of the housing 24 is formed by a temperature control system 1 according to the invention. The housing 24 encloses an interior space 10 of the energy store 2, in which at least one energy storage cell 7 is arranged. The energy storage cell 7 is heat-transferringly connected to the temperature control system 1. The energy store 2 can comprise multiple energy storage cells 7, which are not shown in the drawings.

Figure 2:
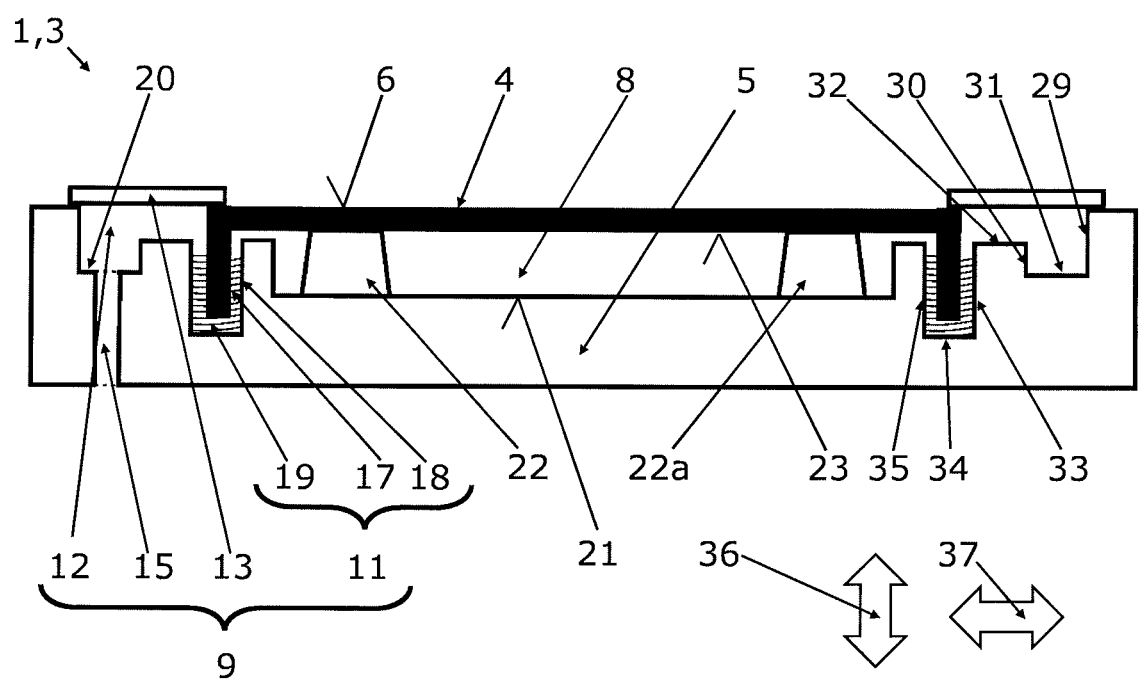
FIG. 2 a sectional view of a temperature control system according to the invention, FIG. 3 a plan view of a temperature control system according to the invention, FIG. 4 a sectional view of a further embodiment of a temperature control system according to the invention, FIG. 5 a schematic representation of a motor vehicle according to the invention.
Figure 3:
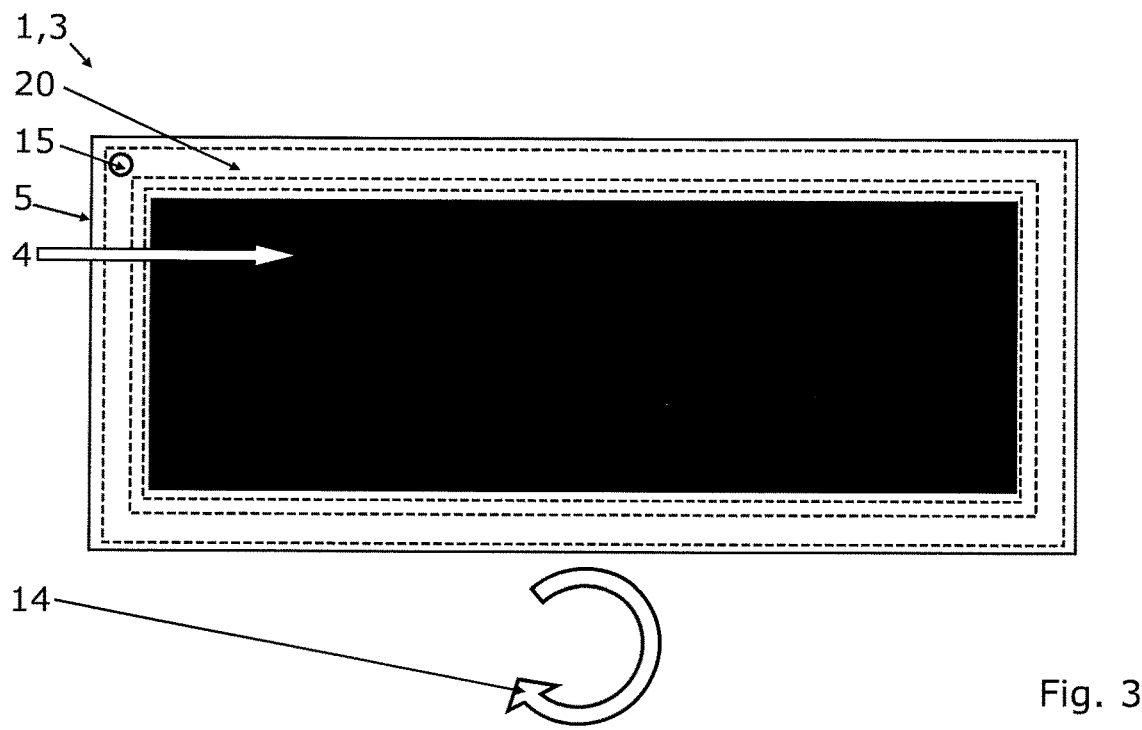

The temperature control system 1 according to the invention for temperature controlling the energy store 2 or for temperature controlling the at least one energy storage cell 7 is shown in a sectional representation in FIG. 2 and in a plan view in FIG. 3.

The temperature control system 1 comprises a temperature control plate 3, which comprises at least one contact plate 4 and at least one base plate 5. The contact plate 4 comprises at least one first surface portion 6 for contacting the energy storage cell 7 of the energy store 2. The first surface portion 6 faces away from the base plate 5. This contacting between the first surface portion 6 and the energy storage cell 7 can take place directly or indirectly. Upon an indirect contacting, a heat conduction means which is not shown, in particular a heat conduction paste and/or a heat conduction element which is not shown, in particular a heat conduction film can be arranged for example between the first surface portion 6 and the energy storage cell 7.

Between the contact plate 4 and the base plate 5, at least one flow space 8 for a temperature control fluid is formed. For this purpose, the contact plate 4 comprises at least one second surface portion 23 facing the base plate 5. The base plate 5 comprises a structural surface portion 21, which faces the contact plate 4 and in particular the second surface portion 23. The second surface portion 23 and the structural surface portion 21 are arranged spaced apart from one another along an axial direction 36 so that they at least partly limit and/or enclose the flow space 8.

The structural surface portion 21 comprises multiple structure elevations 22 and 22a, which lie against the second surface portion 23 of the contact plate 4. In FIG. 2, two structure elevations 22 and 22a are exemplarily shown, wherein it is also conceivable that multiple such structure elevations can be formed. The structure elevations 22 and 22a are arranged spaced apart from one another along a transverse direction 37.

Temperature control plate 3 forms at least one sealing portion 9 for sealing the flow space 8 relative to the interior space 10 of the energy store 2. The sealing portion 9 comprises at least one intermediate sealing portion 11 and at least one collection passage 12, wherein the intermediate sealing portion 11 is formed between the flow space 8 and the collection passage 12 for sealing the flow space 8 relative to the collection passage 12. The sealing portion 9 comprises at least one safety seal 13 which is formed for sealing the collection passage 12 relative to the interior space 10 of the energy store 2.

Thus, the flow space 8 is substantially bounded and/or enclosed by the contact plate 4, in particular by the second surface portion 23, and by the base plate 5, in particular by the structural surface portion 21 and by the sealing portion 9, in particular by the intermediate sealing portion 11. The flow space 8 can comprise a temperature control fluid inlet which is not shown and a temperature control fluid outlet which is not shown, which can be fluidically connected to one another by the flow space 8.

The sealing portion 9 is arranged along the contact plate 4 circumferentially in the circumferential direction 14, which is symbolically shown in FIG. 3. The collection passage 12 is arranged outside along the contact plate 4 circumferentially in the circumferential direction 14.

The intermediate sealing portion 11 is at least partly formed by a collar portion 17 of the contact plate 4, an intermediate groove 18 of the base plate 5 and at least one intermediate seal 19. The collar portion 17 is arranged outside along the contact plate 4 circumferentially in the circumferential direction 14. The intermediate groove 18 of the base plate 5 is formed circumferentially in the circumferential direction 14 of the contact plate 4. The intermediate groove 18 of the base plate 5 can be formed so that the collar portion 17 of the contact plate 4 can be partly inserted in the intermediate groove 18 along the axial direction 36. The collar portion 17 is at least partly arranged in the intermediate groove 18, wherein the intermediate seal 19 seals the collar portion 17 in the intermediate groove 18 relative to the base plate 5. The intermediate seal 19 can be introduced into the intermediate groove 18 for example as sealing compound and/or adhesive sealing compound, before the collar portion 17 is inserted into the intermediate groove 18. By way of this, a firmly bonded connection between the contact plate 4 and the base plate 5 for example can be achieved with sealing of the flow space 8 at the same time.

The collection passage 12 is at least partly formed by at least one passage groove 20 of the base plate 5, at least partly by the collar portion 17 of the contact plate 4, at least partly by the intermediate seal 19 and at least partly by the safety seal 13. In other words, the fluid-limiting side walls of the collection passage 12 are at least partly formed by the passage groove 20 of the base plate 5, at least partly by the collar portion 17 of the contact plate 4, at least partly by the intermediate seal 19 and at least partly by the safety seal 13.

The intermediate groove 18 of the base plate 5 can comprise an intermediate groove inner wall 35, which in FIG. 2 substantially extends along the axial direction 36. The intermediate groove 18 of the base plate 5 can comprise an intermediate groove outer wall 33, which in FIG. 2 substantially extends along the axial direction 36. The intermediate groove inner wall 35 and the intermediate groove outer wall 33 can have a substantially same longitudinal extent along the axial direction 36. The intermediate groove inner wall 35 and the intermediate groove outer wall 33 can be arranged spaced apart from one another along the transverse direction 37. The intermediate groove inner wall 35 and the intermediate groove outer wall 33 can be connected to one another at least via an intermediate groove bottom 34. The intermediate groove bottom 34 can extend in FIG. 2 substantially along the transverse direction 37.

The passage groove 20 of the space plate 5 can comprise a collection passage outer wall 29, in FIG. 2 substantially extends along the axial direction 36. The passage groove 20 of the base plate 5 can comprise a collection passage middle wall 30, which in FIG. 2 substantially extends along the axial direction 36. The collection passage outer wall 29 and the collection passage centre wall 30 can have a different longitudinal extent along the axial direction 36. In particular, the collection passage outer wall 29 can have a longer longitudinal extent along the axial direction 36 than the collection passage middle wall 30. The collection passage outer wall 29 and the collection passage middle wall 30 can be arranged spaced apart from one another along the transverse direction 37. The collection passage outer wall 29 and the collection passage middle wall 30 can be connected to one another at least via an outer collection passage bottom 31. The outer collection passage bottom 31 can extend in FIG. 2 substantially along the transverse direction 37.

The collection passage middle wall 30 and the intermediate groove outer wall 33 can be arranged spaced apart from one another along the transverse direction 37. The collection passage middle wall 30 and the intermediate groove outer wall 33 can be connected to one another at least via an intermediate bottom 32. The outer collection passage bottom 31 can extend in FIG. 2 substantially along the transverse direction 37.

The inner bottom 32, the outer passage collection bottom 31 and the intermediate groove bottom 34 can each be arranged spaced apart relative to one another along the axial direction 36.

The safety seal 13 can be connected at least partly to a part area of the first surface portion 6 of the contact plate 4 and at least partly to a part area of the base plate 5, in particular connected in a firmly bonded manner in order to form a fluid-limiting wall of the collection passage 12. To this end it can be provided that the safety seal 13 is formed as film or as film seal.

The collection passage 12 comprises a return device 15 for returning the temperature control fluid. This return device 15 is exemplarily formed in FIG. 2 as return passage, which substantially extends along the axial direction 36 and can be connected to a temperature control fluid circuit that is not shown.

Figure 4:
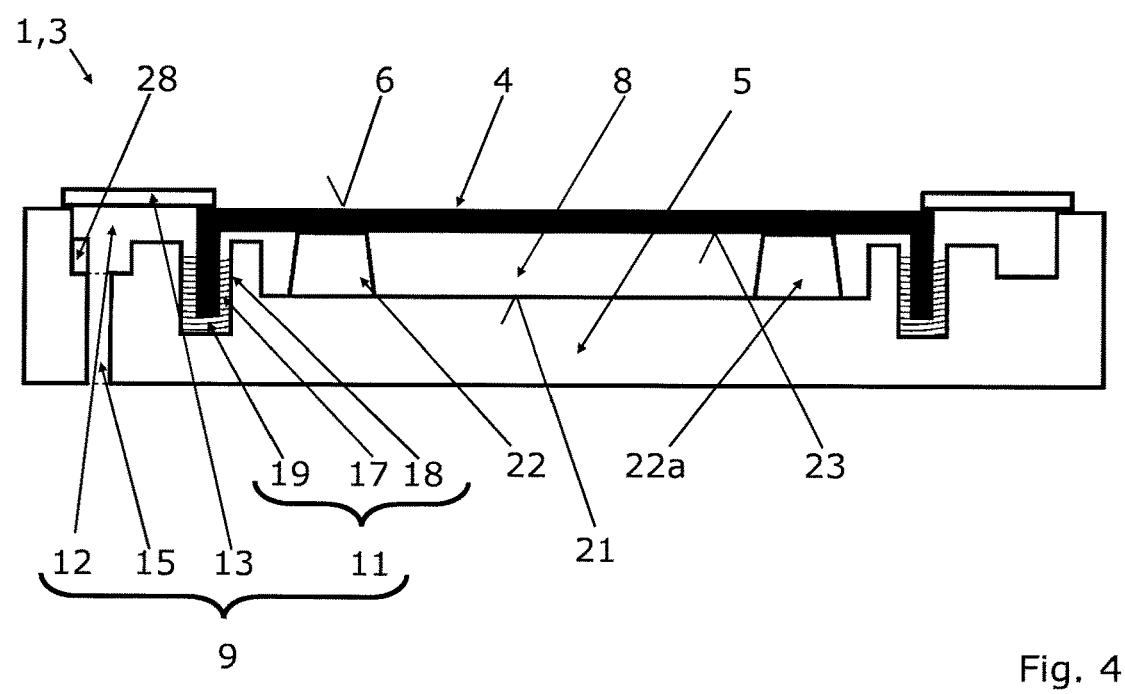

In comparison with the exemplary embodiment of FIG. 2, the exemplary embodiment of the temperature control plate 3 according to the invention of FIG. 4 comprises a sensor unit 28 which is arranged in the collection passage 12. This sensor unit 28 can be formed for example as a moisture sensor and/or liquid sensor and be communicatingly connected to a control device of a motor vehicle 25 that is not shown via signal lines and/or control lines that are not shown.

Figure 5:
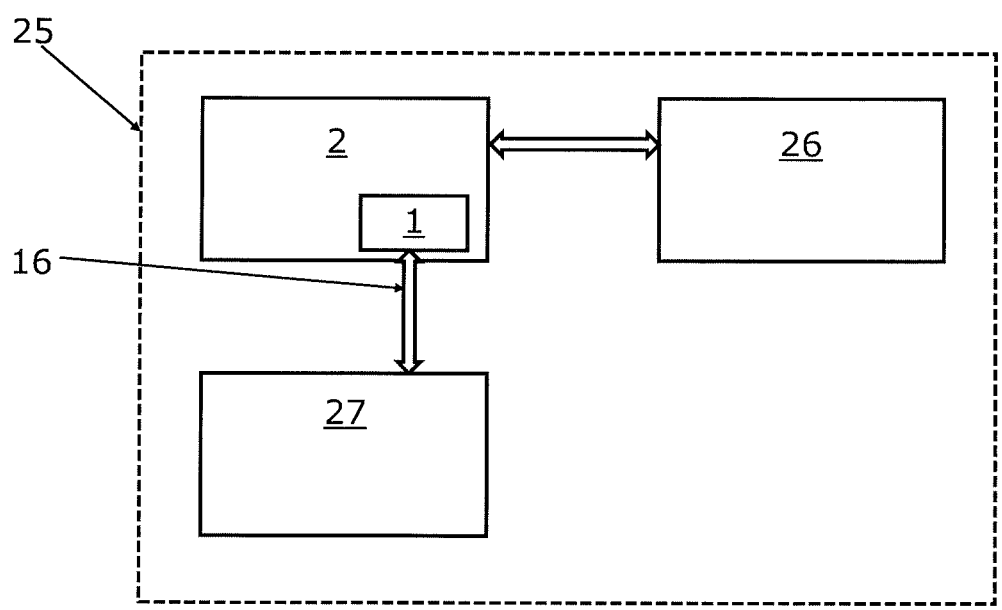

Highly simplified, FIG. 5 shows a motor vehicle 25 according to the invention, in particular an electric and/or hybrid vehicle, having an energy store 2 according to the invention for the electric energy supply of a drive unit 26 of the motor vehicle 25. The temperature control system 1 of the energy store 2 according to the invention is fluidically connected via a temperature control fluid circuit 16 to at least one heat exchanger 27 of the motor vehicle 25. In particular, the collection passage 12 and/or the return device 15 and/or the flow space 8 can be fluidically connected to the temperature control fluid circuit 16. The temperature control fluid circuit 16 can comprise for example a temperature control fluid delivery device which is not shown.

The invention claimed is:

1. A temperature control system for temperature controlling an energy store, comprising:
   at least one temperature control plate including at least one contact plate and at least one base plate,
   the at least one contact plate comprises at least one surface portion for contacting an energy storage cell of the energy store,
   at least one flow space defined between the at least one contact plate and the at least one base plate,
   the at least one temperature control plate defining at least one sealing portion for sealing the at least one flow space relative to an interior space of the energy store,
   wherein the at least one sealing portion comprises at least one intermediate sealing portion and at least one collection passage,
   wherein the at least one intermediate sealing portion is defined between the at least one flow space and the at least one collection passage and comprises at least one intermediate seal for sealing the at least one flow space relative to the at least one collection passage, and
   wherein the at least one sealing portion includes at least one safety seal, structured and arranged to seal the at least one collection passage relative to the interior space.

2. The temperature control system according to claim 1, wherein the at least one sealing portion is arranged along the at least one contact plate circumferentially in a circumferential direction, and wherein the at least one intermediate seal and the at least one safety seal are arranged spaced apart from one another.

3. The temperature control system according to claim 1, wherein the at least one collection passage is arranged outside of the at least one intermediate seal along the at least one contact plate circumferentially in a circumferential direction.

4. The temperature control system according to claim 1, wherein the at least one collection passage comprises at least one return device for returning the temperature control fluid.

5. The temperature control system according to claim 4, wherein at least one of:
   at least one of the at least one collection passage and the at least one return device is fluidically connected to a temperature control fluid circuit, and
   the at least one flow space is fluidically connected to the temperature control fluid circuit.

6. The temperature control system according to claim 1, wherein:
   the at least one intermediate sealing portion is at least partly provided by a collar portion of the at least one contact plate, an intermediate groove of the at least one base plate, and the at least one intermediate seal,
   wherein the collar portion is arranged outside along the at least one contact plate circumferentially in a circumferential direction,
   wherein the intermediate groove of the at least one base plate is defined circumferentially in the circumferential direction of the at least one contact plate,
   wherein the collar portion is at least partly arranged in the intermediate groove, and
   wherein the at least one intermediate seal seals the collar portion in the intermediate groove relative to the at least one base plate.

7. The temperature control system according to claim 1, wherein the at least one collection passage is at least partly provided by at least one passage groove of the at least one base plate.

8. The temperature control system according to claim 6, wherein at least one of:
   the at least one collection passage is at least partly provided by at least one of the collar portion of the at least one contact plate and the at least one intermediate seal, and
   the at least one collection passage is at least partly formed by the at least one safety seal.

9. The temperature control system according to claim 6, wherein at least one of:
   the at least one intermediate seal is structured as a static sealing element, and
   the at least one safety seal is structured as a static sealing element.

10. The temperature control system according to claim 1, wherein:
    the at least one base plate comprises at least one structural surface portion including a plurality of structure elevations, and
    wherein the plurality of structure elevations lie against a second surface portion of the at least one contact plate facing towards the at least one base plate.

11. The temperature control system according to claim 1, further comprising at least one sensor unit arranged in the at least one collection passage.

12. An energy store for an electric and/or hybrid vehicle, comprising:

at least one energy storage cell and at least one temperature control system, the at least one temperature control system including:
   at least one temperature control plate including at least one contact plate and at least one base plate;
   the at least one contact plate having at least one surface portion for contacting the at least one energy storage cell;
   at least one flow space defined between the at least one contact plate and the at least one base plate;
   the at least one temperature control plate defining at least one sealing portion for sealing the at least one flow space relative to an interior space of the energy store;
   the at least one sealing portion comprising at least one intermediate sealing portion and at least one collection passage;
   wherein the at least one intermediate sealing portion is defined between the at least one flow space and the at least one collection passage for sealing the at least one flow space relative to the at least one collection passage;
   wherein the at least one collection passage is at least partly provided by at least one passage groove of the at least one base plate that runs in a circumferential direction around the at least one flow space; and
   wherein the at least one sealing portion includes at least one safety seal, structured and arranged to seal the at least one collection passage relative to the interior space; and
wherein the at least one energy storage cell is arranged in the interior space and is heat-transferringly connected to the at least one contact plate of the at least one temperature control system.

13. The energy store according to claim 12, wherein:
the interior space is enclosed by a housing of the energy store, and
the at least one temperature control system defines a housing portion of the housing.

14. A motor vehicle, comprising:
an energy store for an electric energy supply of a drive unit, the energy store including at least one energy storage cell and at least one temperature control system, the at least one temperature control system including:
   at least one temperature control plate including at least one contact plate and at least one base plate;
   the at least one contact plate having at least one surface portion for contacting the at least one energy storage cell;
   at least one flow space defined between the at least one contact plate and the at least one base plate;
   the at least one temperature control plate defining at least one sealing portion for sealing the at least one flow space relative to an interior space of the energy store;
   the at least one sealing portion comprising at least one intermediate sealing portion and at least one collection passage;
   wherein the at least one intermediate sealing portion is defined between the at least one flow space and the at least one collection passage and comprises at least one intermediate seal for sealing the at least one flow space relative to the at least one collection passage; and
   wherein the at least one sealing portion includes at least one safety seal, structured and arranged to seal the at least one collection passage relative to the interior space; and
wherein the at least one energy storage cell is arranged in the interior space and is heat-transferringly connected to the at least one contact plate of the at least one temperature control system.

15. The motor vehicle according to claim 14, the at least one temperature control system of the energy store is fluidically connected to at least one heat exchanger.

16. The motor vehicle according to claim 14, wherein the energy store is a traction battery.

17. The motor vehicle according to claim 14, wherein the at least one intermediate seal is arranged in an intermediate groove disposed in the at least one base plate and extending in a circumferential direction.

18. The motor vehicle according to claim 14, wherein the at least one safety seal is arranged along the at least one contact plate circumferentially in a circumferential direction.

19. The temperature control system according to claim 1, wherein at least one of:
   the at least one intermediate seal is structured as at least one of a sealing compound, a shaped sealing element, a film sealing element, and a ring sealing element, and
   the at least one safety seal is structured as at least one of a sealing compound, a shaped sealing element, a film sealing element, and a ring sealing element.

20. The energy store according to claim 12, wherein the at least one intermediate sealing portion includes at least one intermediate seal structured and arranged to extend in the circumferential direction between the at least one collection passage and the at least one flow space.

* * * * *